(12) United States Patent
Langh (10) Patent No.: US 11,273,406 B2
(45) Date of Patent: Mar. 15, 2022

(54) METHOD FOR TREATING IMPURITIES CONTAINED IN EXHAUST GASES OF SHIPS, SHIP WITH EXHAUST GAS SCRUBBER, AND PURIFICATION UNIT

(71) Applicant: OY LANGH TECH AB, Piikkiö (FI)

(72) Inventor: Hans Langh, Piikkio (FI)

(73) Assignee: OY LANGH TECH AB, Piikkio (FI)

( * ) Notice: Subject to any disclaimer, the term of this patent is extended or adjusted under 35 U.S.C. 154(b) by 1760 days.

(21) Appl. No.: 14/368,406

(22) PCT Filed: Oct. 11, 2012

(86) PCT No.: PCT/FI2012/050977
§ 371 (c)(1),
(2) Date: Jun. 24, 2014

(87) PCT Pub. No.: WO2013/121081
PCT Pub. Date: Aug. 22, 2013

(65) Prior Publication Data
US 2015/0007719 A1  Jan. 8, 2015

(30) Foreign Application Priority Data
Feb. 13, 2012 (FI) .................................... 20125156

(51) Int. Cl.
*B01D 53/14* (2006.01)
*B01D 65/02* (2006.01)
(Continued)

(52) U.S. Cl.
CPC ..... *B01D 53/1425* (2013.01); *B01D 53/1481* (2013.01); *B01D 53/50* (2013.01);
(Continued)

(58) Field of Classification Search
None
See application file for complete search history.

(56) References Cited

U.S. PATENT DOCUMENTS 5,244,579 A * 9/1993 Horner ................. B01D 61/022
210/195.2
5,518,624 A * 5/1996 Filson .................... B01D 61/16
210/500.26
(Continued)

FOREIGN PATENT DOCUMENTS

CN 101104130 1/2008
CN 101468856 A 7/2009
(Continued)

OTHER PUBLICATIONS

Extended European search report, dated Sep. 4, 2015; Application No. 12868418.0.
(Continued)

*Primary Examiner* — Christopher P Jones
*Assistant Examiner* — Phillip Y Shao
(74) *Attorney, Agent, or Firm* — Nixon & Vanderhye (57) ABSTRACT

Method for treating impurities contained in exhaust gases of ships to reduce sulphur oxide and other emissions. In order for the method to purify wash water exiting from an exhaust gas scrubber sufficiently enough to be directly dischargeable to sea, and in order for a purification unit used to be small enough to be easily placed onboard a ship, exhaust gases are scrubbed in the exhaust gas scrubber and wash water containing impurities and exiting from the scrubber is supplied to the purification unit, circulated in an effluent circuit, and filtered through a semipermeable membrane of a filter to obtain purified effluent and a residue containing impurities, when necessary, the pH value of the purified effluent is adjusted to be at least 6.5, after which it is discharged into the sea or recycled to the scrubber while the residue containing impurities is led back to the effluent circuit.

13 Claims, 3 Drawing Sheets

(51) Int. Cl.
| | |
|---|---|
| B01D 61/04 | (2006.01) |
| B01D 61/14 | (2006.01) |
| C02F 1/44 | (2006.01) |
| B01D 61/16 | (2006.01) |
| B01D 61/02 | (2006.01) |
| B01D 53/92 | (2006.01) |
| B01D 53/50 | (2006.01) |
| B01D 53/96 | (2006.01) |
| C02F 1/42 | (2006.01) |
| C02F 103/18 | (2006.01) |
| C02F 103/00 | (2006.01) |
| C02F 1/66 | (2006.01) |

(52) U.S. Cl.
CPC .............. *B01D 53/92* (2013.01); *B01D 53/96* (2013.01); *B01D 61/025* (2013.01); *B01D 61/027* (2013.01); *B01D 61/04* (2013.01); *B01D 61/145* (2013.01); *B01D 61/16* (2013.01); *B01D 65/02* (2013.01); *C02F 1/44* (2013.01); *B01D 2252/103* (2013.01); *B01D 2252/1035* (2013.01); *B01D 2257/302* (2013.01); *B01D 2258/012* (2013.01); *B01D 2259/4566* (2013.01); *B01D 2311/04* (2013.01); *B01D 2311/06* (2013.01); *B01D 2311/25* (2013.01); *B01D 2317/022* (2013.01); *B01D 2317/04* (2013.01); *B01D 2321/04* (2013.01); *B01D 2321/162* (2013.01); *B01D 2321/18* (2013.01); *B01D 2321/2058* (2013.01); *C02F 1/42* (2013.01); *C02F 1/442* (2013.01); *C02F 1/444* (2013.01); *C02F 1/66* (2013.01); *C02F 2103/008* (2013.01); *C02F 2103/18* (2013.01); *C02F 2209/06* (2013.01); *C02F 2209/11* (2013.01); *Y02A 50/20* (2018.01)

(56) References Cited

U.S. PATENT DOCUMENTS

| | | | | |
|---|---|---|---|---|
| 6,183,646 | B1* | 2/2001 | Williams | A61L 2/16 210/199 |
| 6,810,662 | B2 | 11/2004 | Sundholm | |
| 7,578,939 | B2* | 8/2009 | Masten | B01D 61/04 210/490 |
| 8,038,774 | B2 | 10/2011 | Peng | |
| 2002/0017483 | A1 | 2/2002 | Chesner et al. | |
| 2002/0189987 | A1 | 12/2002 | Wagner | |
| 2004/0079228 | A1 | 4/2004 | Wijmans et al. | |
| 2008/0044335 | A1* | 2/2008 | Anttila | B01D 53/504 423/243.01 |
| 2008/0197075 | A1 | 8/2008 | Musale et al. | |
| 2010/0206171 | A1 | 8/2010 | Peng | |
| 2010/0224062 | A1 | 9/2010 | Patterson et al. | |
| 2010/0224070 | A1 | 9/2010 | Patterson et al. | |
| 2010/0266472 | A1 | 10/2010 | Peng | |
| 2011/1000913 | | 5/2011 | Minami et al. | |
| 2012/0018671 | A1 | 1/2012 | Plant | |
| 2014/0175021 | A1* | 6/2014 | Ueyama | B63J 4/002 210/747.6 |
| 2015/0007719 | A1 | 1/2015 | Langh | |

FOREIGN PATENT DOCUMENTS

| | | |
|---|---|---|
| CN | 101757846 | 6/2010 |
| DE | 20 2004 002 616 | 6/2004 |
| EP | 0592372 | 4/1994 |
| EP | 0656806 | 9/1996 |
| EP | 1 857 169 | 11/2007 |
| EP | 1957181 B1 | 3/2009 |
| EP | 2 402 288 | 1/2012 |
| EP | 3 028 760 | 6/2016 |
| EP | 2788104 | 12/2017 |
| GB | 2288342 A | 10/1995 |
| WO | 94-05400 | 3/1994 |
| WO | 99/44722 | 9/1999 |
| WO | 02-055182 | 7/2002 |
| WO | 2007-045721 | 4/2007 |
| WO | 2011073503 A1 | 6/2011 |
| WO | 2011-085908 | 7/2011 |
| WO | 2012-014199 | 2/2012 |
| WO | 2013-121081 | 8/2013 |

OTHER PUBLICATIONS

An et al., "New Application of Seawater and Electrolyzed Seawater in Air Pollution Control of Marine Diesel Engine," JSME International Journal, Series B, Fluids and Thermal engineering, vol. 46, No. 1, Jan. 1, 2003, pp. 206-213.

Future filtration. Filtration of scrubber water. LiqTech International, [Retrieved on Jun. 19, 2013], Retrieved from the Internet: <URL:http://www.liqtech.dk/img/user/file/Case_story-filtration_scrubber_water.pdf> pp. 1-2, L: see the extra sheet.

FI Search Report, dated Jun. 29, 2012, from corresponding FI application.

International Search Report, dated Aug. 19, 2013, from corresponding PCT application.

Notice of Opposition for European Patent Application No. 12868418, dated Sep. 17, 2018.

United States Environmental Protection Agency, "Exhaust Gas Scrubber Washwater Effluent," Nov. 2011.

Martinvuo-Helo, "Classification of SOx Scrubber Installation for ships," Vaasan Ammattikorkeakoulu Vasa Yrkeshogskola University of Applied Sciences, Technology and communication 2011.

Industrial Water Maker, SWI Series, Pure Aqua, Inc.

EcoHydro Solutions Industrial Sea Water Desalination Systems, http://www.ecohydrosolutions.com/Industrial/Products/SWI/SeaWaterDesalination.html.

Hamworthy, Membrane BioReactor, Grey and Black Water Treatment, Water Systems.

EcoHydro Solutions Industrial Sea Water Desalination Systems, http://www.ecohydrosolutions.com/Industrial/Products/SWI/SeaWaterDesalination.html, Jul. 4, 2017.

EcoHydro Solutions Industrial Sea Water Desalination Systems, http://www.ecohydrosolutions.com/Industrial/Products/SWI/SeaWaterDesalination.html, Feb. 24, 2017.

Notice of Opposition for European Patent Application No. 12868418, dated Sep. 18, 2018.

Higgins et al., "Flue Gas Desulfurization Wastewater Treatment Primer," https://www.powermag.com/flue-gas-desulfuirization-wastewater-treatment-primer/.

Viswanadh Meda, "Size characterisation of industrial effluents for optimal selection of treatment technology," Department of Water and Environmental Engineering, Lunds Institute of Technology, University of Lund, Master's Thesis No. 2004-05, Dec. 2004.

Yin et al., "Integrated Membrane Process for the Treatment of Desulfurization Wastewater," Ind. Eng. Chem. Res. 2010, 49, 3337-3341.

Shemwell et al., "A Laboratory Investigation on Combined In-Furnace Sorbent Injection and Hot Flue-Gas Filtration to Simultaneously Capture SO2, NOx, HCl, and Particulate Emissions," Environ. Sci. Technol. 2000, 34, 4855-4866.

"Membrane Filtration," Adapted from PA website dated Nov. 2005, and National Drinking Water Clearing House Web site, dated Mar. 1999, https://www.mrwa.com/WaterWorksMnI/Chapter%2019%20Membrane%20Filtration.pdf.

Wartsila delivers a marine scrubber to Containerships Ltd., Jan. 19, 2011, http:www.wartsila.com/media/news/19-01-2011-wartsila-delivers-a-marine-scrubber-to-containerships-ltd.

Fermentation and Biochemical Engineering Handbook: Principles, Process Design and Equipment, HC Vogel, CM Todaro—William Andrew, Dec. 31, 1996, Chapter 7, "Cross-Flow Flitration," Ramesh R. Bhave.

(56) References Cited

OTHER PUBLICATIONS

K. Scott, in Handbook of Industrial Membranes (Second Edition), 1995, https://wvvw.sciencedirect.com/topics/chemistry/mernbrane-fiiter.

Notice of Opposition for European Patent Application No. 12/868,418, dated Sep. 20, 2018.

Tier III Compliance, Low Speed Engines, pp. 3-26, MAN Diesel & Turbo, Copenhagen, Denmark, Jul. 31, 2010.

SEAHORSE 35, Emission Concept Study 35.000 DWT Bulk Carrier, Nov. 26, 2009, Soren Schnack.

Green Ship of the Future Conference, Oct. 26, 2009, The Danish Society for Naval Architecture and Marine Engineering.

35.000 dwt bulk carrier exhaust gas emission reduction concept study, Dec. 2009, Soren Schnack.

Water Cleaning Unit Scrubber, Drawing No. Z121219, Boll & Kirch Filterbu GmbH, Jun. 23, 2009.

Boll & Kirch Filterbu GmbH, "Scrubber Walter Filtration System," Dec. 9, 2009.

Institut fur Siedlungsabfallwirtschaft, Ministerium fur Umwelt NRW, "Membrantechnik fur die Abwasserreinigung" RW Verlag, Mar. 1, 2006, Ed. 2, ISBN: 3-939377-00-07.

Canadian Office Action for Application No. 2,858,500, dated Jul. 30, 2018.

Schnack, "35.000 dwt bulk carrier exhaust gas emission reduction concept study," Green Ship of the Future, Grontmij | Carl Bro, Dec. 2009, pp. 1-98.

Schnack, "Emission Concept Study 35.000 DWT Bulk Carrier," SeaHorse 35, Green Ship of the Future, Grontmij | Carl Bro, Nov. 26, 2009, 32 pages.

Larmi, "Catalysators and diesel engines" Statement, Dec. 30, 2019, Aalto University, 1 page.

Baker, "Membrane Technology and Applications," John Wiley & Sons Ltd., 2004, pp. 258-263.

Anonymous, "Oily Bilgewater Separators," United States Environmental Protection Agency, Office of Wastewater Management, Nov. 2011, 98 pages.

Maribo, "Novel Membrane Separation System for Shipboard Oily Wastewater Treatment," Final Report, ESTCP Project WP-200215, Dec. 2010, 70 pages.

Baker, "Membrane Technology and Applications," 2nd Edition, John Wiley & Sons Ltd., 2004, pp. 262-272.

Scott, "Handbook of Industrial Membranes," 1st Edition, Elsevier, 1995, pp. 575-629.

Anonymous, "Resolution MEPC.184(59)," Jul. 17, 2009, 2009 Guidelines for Exhaust Gas Cleaning Systems, 25 pages.

Anonymous, "Low Emission Study," May 2011, https://web.archive.org/web/20110529200329/http://www.greenship.org/lowemissionconceptstudy/, 6 pages.

Anonymous, "List of wastewater treatment technologies," Wikipedia, Apr. 18, 2019, https://en.wikipedia.org/wiki/List_of_wastewater_treatment_technologies, 2 pages.

Seader et al., "Separation Process Principles," Chapter 14, Membrane Separations, John Wiley & Sons Inc., 2006, pp. 493-535.

Boll & Kirch Filterbau GmbH, "bipolar continuous, process-optimised," Bollfilter Automatic Type 6.18/6.19, 1996/1998, 8 pages.

* cited by examiner

METHOD FOR TREATING IMPURITIES CONTAINED IN EXHAUST GASES OF SHIPS, SHIP WITH EXHAUST GAS SCRUBBER, AND PURIFICATION UNIT

BACKGROUND OF THE INVENTION

The invention relates to a method for treating impurities contained in exhaust gases of ships, the method comprising scrubbing with water the exhaust gases in an exhaust gas scrubber in order to reduce sulphur dioxide emissions of the exhaust gases, supplying wash water to be purified, containing impurities and exiting from the exhaust gas scrubber, to a purification unit onboard a ship, and monitoring a pH value of the purified effluent, and if it is less than 6.5, it is adjusted to a value of at least 6.5, after which the purified effluent is discharged into a sea or returned to the exhaust gas scrubber.

The invention also relates to a ship comprising an exhaust gas scrubber for scrubbing exhaust gases from the ship's combustion engine and for reducing sulphur dioxide emissions, and a purification unit for purifying wash water to be purified and exiting from the exhaust gas scrubber.

The invention further relates to a purification unit for purifying polluted wash water, i.e. effluent, exiting from an exhaust gas scrubber of a ship.

From US 2010224070 A1 a method of aforesaid kind and a ship of the above type are known.

It is widely known to clean exhaust gases from ships' engines by means of exhaust gas scrubbers. The purpose is to reduce sulphur dioxide emissions of the exhaust gases in particular since they are problematic to the environment. Sulphur dioxide emissions occur because engines of a ship use a sulphur-containing fuel, which oxidizes during fuel combustion process in the engine. Low sulphur fuels enable sulphur dioxide emissions to be reduced but the low sulphur fuels are expensive. In order to be able to use fuels whose sulphur content can be relatively high, i.e. higher than that in so-called low sulphur fuels, exhaust gases are scrubbed in exhaust gas scrubbers, enabling sulphur dioxide emissions to be dramatically reduced as compared with not scrubbing the exhaust gases. An exhaust gas scrubbing process produces wash water which contains impurities and which as such cannot be discharged into the sea since the wash water contains a large amount of impurities and, typically, the pH value of the wash water is also too low for it to be allowed to be discharged into the sea. Wash water exiting from the exhaust gas scrubber may be fed back to the exhaust gas scrubber, but the wash water cannot be recirculated "endlessly" in this way since the wash water only becomes more polluted the more exhaust gases are scrubbed therewith. Prior to being discharged into the sea, wash water has been diluted with water, but this does not eliminate the environmental problems caused by the effluent. No success has been achieved in purifying the wash water well enough to be able to discharge it from the ship into the sea. A procedure according to which the wash water is collected to large tanks onboard the ship wherefrom it is pumped at a harbour and transported to purification plants ashore is, due to the large amount of wash water, so laborious that it is not implementable in practice.

The above-described ways to treat exhaust gases and impurities transferred from the exhaust gas scrubber to the wash water do not provide a good end result (do not eliminate impurities as efficiently as desired) or are complicated (e.g. the transfer of wash water from the ship to the shore) and necessitate the use of chemicals.

From U.S. Pat. No. 6,810,662 B2 an arrangement is known for purifying exhaust gases from a combustion engine in exhaust gas scrubbers. However, the document does not disclose how to treat wash water or reaction products produced when water reacts with compounds contained in the exhaust gases.

From GB 2288342 an arrangement is known for purifying exhaust gases from a combustion engine in an exhaust gas scrubber. The document discloses purification of wash water in a purification unit wherein the solid impurity particles contained in the wash water are collected in a filter. The problem is, however, that the described purification unit is incapable of treating and removing from the wash water impurities dissolved therein, or extremely small impurity particles, either.

BRIEF DESCRIPTION OF THE INVENTION

An object of the invention is thus to provide a method for treating impurities contained in exhaust gases of ships, which method is easily implementable and capable of efficiently eliminating impurities.

In order to achieve this, the present invention provides a method for treating impurities contained in exhaust gases of ships in order to reduce sulphur oxide emissions, the method comprising:

scrubbing with water the exhaust gases in an exhaust gas scrubber in order to reduce sulphur dioxide emissions of the exhaust gases, supplying wash water to be purified, containing impurities and exiting from the exhaust gas scrubber, to a purification unit onboard a ship, the purification unit comprising an effluent circuit including at least one membrane filter, monitoring a pH value of the purified effluent, and if it is less than 6.5, it is adjusted to a value of at least 6.5, after which the purified effluent is discharged into a sea or returned to the exhaust gas scrubber, circulating the wash water to be purified, i.e. the effluent, in the effluent circuit, filtering the effluent through a semipermeable membrane of said membrane filter in order to achieve purified effluent and a residue containing impurities, and removing the purified effluent from said membrane filter and from circulation of the effluent circuit while the residue keeps on circulating in the effluent circuit.

In the method according to the invention, the impurity concentration of the effluent in the effluent circuit increases the more the more effluent is supplied to the effluent circuit, whereby the pressure difference required for carrying out the purification process increases. Consequently, at least some of the residue in the effluent circuit, highly concentrated with impurities, is at intervals removed from the effluent circuit, whereby preferably the effluent having a very high impurity concentration is collected in a tank for further treatment. Since the amount and volume of the latter effluent is only a fraction as compared with the amount of wash water containing impurities and exiting from the exhaust gas scrubber into the purification unit and the amount of effluent purified in the purification unit, the collection to a tank is easy to implement in practice. The contents of the tank are easy to deliver to a waste treatment plant for treating the effluent contained therein. It is to be noted that while cleaning the effluent circuit, it is not necessary to remove all the water concentrated with impurities in one go, although this is preferable so as to make the amount of effluent exiting from the effluent circuit small.

In order to maintain the purification capability of the membrane filter, the membrane filter is cleaned at intervals when its semipermeable membrane is filled with impurities. Preferably, the cleaning is carried out by backwashing, whereby the impurities in the semipermeable membrane of the membrane filter are removed. The impurities are collected in a tank for further treatment. The tank may be the same tank in which the effluent removed from the effluent circuit and having a high impurity concentration is collected.

In order for any largish solid impurities in the effluent not to collect in or obstruct the semipermeable membrane of the membrane filter, the effluent is preferably filtered by a coarse filter and/or a micro filter prior to supplying the effluent to the effluent circuit.

Preferred embodiments of the method according to the invention are disclosed in the attached claims.

The present invention provides a ship enabling the method according to the invention to be implemented, the ship comprising an exhaust gas scrubber for scrubbing exhaust gases from the ship's combustion engine and for reducing sulphur dioxide emissions, and a purification unit for purifying wash water to be purified and exiting from the exhaust gas scrubber, wherein the purification unit comprises an effluent circuit comprising a circulation pump and at least one membrane filter comprising a semipermeable membrane, the circulation pump being arranged to circulate the effluent to be purified in the effluent circuit by feeding effluent to an inlet end of said at least one membrane filter such that effluent flowing through the membrane filter filters through the semipermeable membrane and exits, purified, from an outlet of said at least one membrane filter and from the effluent circuit while a residue containing impurities is led from a discharge end of the membrane filter back to the circulation pump and from the circulation pump again to the inlet end of the membrane filter.

Preferably, the effluent circuit may comprise a plurality of membrane filters to enable the filtering efficiency of the purification unit to correspond with the need to purify even large amounts of impurities and a large amount of effluent, which in practice is the situation when large amounts of impurities are produced during combustion process because of the large amount of sulphur contained in the fuel and/or because of a (large) combustion engine consuming a lot of fuel. An appropriate filter set is achieved by building it from membrane filters available on the market.

Preferred embodiments of the ship according to the invention are disclosed in the attached claims.

The present invention provides a purification unit for purifying polluted wash water, i.e. effluent, exiting from an exhaust gas scrubber of a ship, the purification unit being a transferrable container-like unit comprising a first connecting means for connecting the purification unit to an effluent line coming from the exhaust gas scrubber of the ship, a second connecting means for connecting the purification unit to a water distribution circuit of the ship, and an outlet line for discharging from the purification unit the effluent purified therein, the effluent circuit comprising a circulation pump and at least one membrane filter comprising a semipermeable membrane, the circulation pump being arranged to circulate the effluent to be purified in the effluent circuit by feeding effluent to an inlet end of said membrane filter such that effluent flowing through said membrane filter filters through the semipermeable membrane and exits, purified, from an outlet of said membrane filter and from the effluent circuit while a residue containing impurities is led from a discharge end of said membrane filter back to the circulation pump and from the circulation pump again to the inlet end of said membrane filter.

Preferably, the purification unit comprises a third connecting means for connecting the purification unit to a pressurized air circuit of the ship so as to enable pressurized air to be applied to a clean side of the membrane filter.

The invention is based on the idea of combining with the purification of exhaust gases implemented by means of an exhaust gas scrubber the treatment of wash water, i.e. effluent, exiting from the exhaust gas scrubber and containing impurities in the purification unit utilizing a membrane filter comprising a semipermeable membrane so as to enable impurities dissolved in the effluent and microscopically small impurities in a highly concentrated form to be removed from the effluent with no need to use large storage tanks for intermediate storage of the effluent, and a vast majority of the treated waste water, purified as prescribed by regulations, to be pumped into the sea.

An advantage of the method and ship according to the invention is that the utilization of the membrane filter makes the need for space required by the purification unit so small that the purification unit becomes easy to place onboard a ship. The purification unit is capable of purifying the wash water, i.e. the effluent, exiting from the exhaust gas scrubber and containing impurities so efficiently that the purified water exiting from the effluent circuit can be discharged directly into the sea. Alternatively, the purified water may be returned back to the exhaust gas scrubber and recirculated. Consequently, no need exists to treat large amounts of wash water onshore, and no need exists to use chemicals to separate impurities from the wash water, either.

BRIEF DESCRIPTION OF THE FIGURES

The invention is now described in closer detail by means of two examples and with reference to the accompanying drawing, in which.

DETAILED DESCRIPTION OF THE INVENTION

Figure 1:
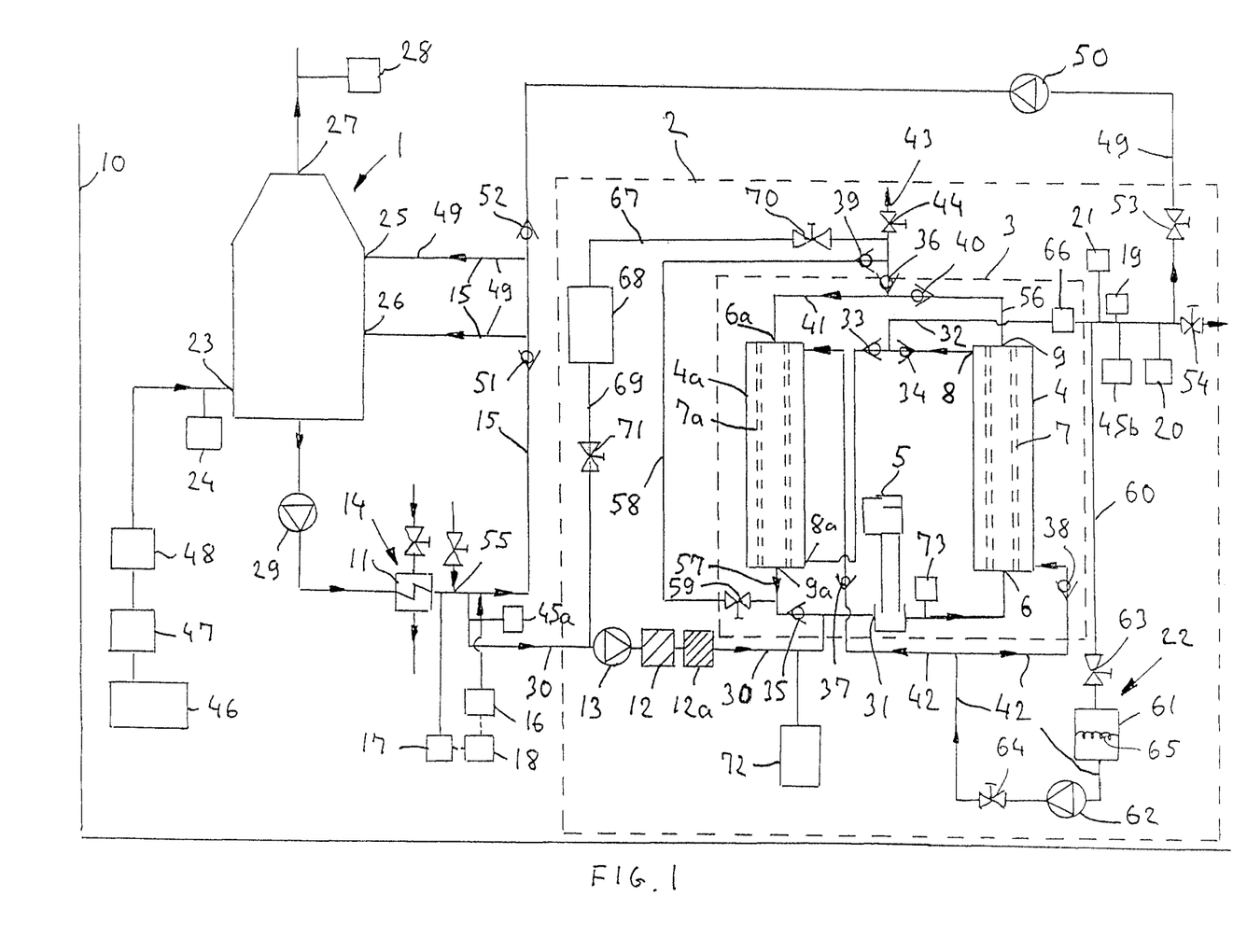
FIG. 1 illustrates a first embodiment for treating impurities contained in exhaust gases.

FIG. 1 shows an exhaust gas scrubber 1 onboard a ship and a purification unit 2 connected thereto for purifying wash water exiting from the exhaust gas scrubber. Reference number 10 illustrates a ship. The ship's combustion engine is illustrated by reference number 46, a catalyser connected to the combustion engine 46 is designated by reference number 47, while reference number 48 designates an exhaust gas boiler. The combustion engine 46 is a diesel engine. The catalyser 47 reduces nitrogen oxide emissions. Preferably, the catalyser 47 uses urea for reducing the nitrogen oxide emissions. The structure and operation of the catalyser 47 are not discussed in this connection since they are known to those skilled in the art. The exhaust gases cool down in the exhaust gas boiler 48. At the same time as the exhaust gas boiler 48 cools down the exhaust gases, heat energy is recovered from the exhaust gases for the ship's various heating needs. The operation of the exhaust gas boiler 48 is known to one skilled in the art, so the structure and operation of the exhaust gas boiler are not explained in closer detail herein.

In the arrangement of the figure, the exhaust gases from the combustion engine 46 of the ship 10 are at point 23 led into the exhaust gas scrubber 1. A measuring device 24 is used for determining the carbon dioxide concentration ($CO_2$ concentration) of the exhaust gases in percent by volume prior to feeding the exhaust gases to the exhaust gas scrubber 1. Because of the exhaust gas boiler 48, the exhaust gases arrive at the exhaust gas scrubber 1 cooled down, whereby their volume and flow rate are smaller than with no exhaust gas boiler 48 and the water demand for purifying the exhaust gases decreases. Water from points 25 and 26 is sprayed onto the exhaust gases. Preferably, the water is basic, but neutral water may also be used. The number and location of spraying points 25, 26 may vary. The purified exhaust gases exit from the exhaust gas scrubber 1 at point 27. A measuring device 28 is used for determining the sulphur dioxide concentration ($SO_2$ concentration) of the exhaust gases exiting from the exhaust gas scrubber. When scrubbing the exhaust gases, a ratio of $SO_2/CO_2$ is measured, where $SO_2$ is the sulphur dioxide concentration in percent by volume in flue gas after flue gas purification and $CO_2$ is the carbon dioxide concentration in percent by volume prior to flue gas purification. By adjusting the amount of water supplied to the exhaust gas scrubber, the operation of the exhaust gas scrubber 1 is adjusted such that the ratio $SO_2/CO_2$ is below a given required value, less than 25 ppm $SO_2/CO_2$% (v/v) (that is $SO_2$ (ppm)/$CO_2$ (% v/v)), preferably less than 10 ppm $SO_2/CO_2$% (v/v), and most preferably less than 4.3 ppm $SO_2/CO_2$% (v/v). The scrubbing of exhaust gases in an exhaust gas scrubber 1 being known, the procedure of carrying out the scrubbing is not explained in closer detail herein.

When scrubbing exhaust gases, both solid impurities and impurities dissolved in water collect in the wash water. The hot wash water containing impurities and directed at the bottom of the exhaust gas scrubber 1 is pumped by a pump 29 to a cooling apparatus 14 comprising a heat exchanger 11. The pump 29 is a centrifugal type of pump, for instance. Cold raw water is supplied to the heat exchanger 11, whereby the temperature of the hot wash water supplied to the heat exchanger drops in the heat exchanger e.g. from a value of about 80° C. to a value of 30° C. The raw water is sea water or, alternatively, it may be fresh water (river or lake water). The wash water is led along a line 15 back to the exhaust gas scrubber 1.

It is ensured that the pH value of the wash water exiting from the heat exchanger 11 and returning to the exhaust gas scrubber 1 is at least 7. In practice, this is carried out such that a measuring means 17 determines the pH value of the water, and if the pH value measured by the measuring means 17 is less than 7, a base is fed to the wash water by feeding means 16 so that a pH value of at least 7, preferably 7.5, is achieved. The base to be used is e.g. lye, i.e. sodium hydroxide (NaOH), or another neutralising substance. Control means 18 control preferably automatically the operation of the feeding means 16. The feed rate of wash water to the exhaust gas scrubber 1 is in the order of 100 to 1000 m³/h, mostly depending on the engine power of the ship. In small engines in particular, the feed rate may be less than 100 m³/h, for instance 40 to 100 m³/h. The wash water feed rate is typically 20 to 50 m³/MWh. Thus, the water feed rate for a heavy oil operated diesel engine of about 6000 kW power may typically be 30 to 300 m³/h, and more typically 100 to 250 m³/h, when the wash water feed pressure is 3 to 5 bar. It is possible that the feed pressure is higher than this, in which case the wash water feed rate may be reduced.

When necessary, more water is fed to the line 15 leading to the exhaust gas scrubber 1. Reference number 55 designates the water feeding point to the line 15. The water may be fresh water or salt water. The line 15 may also be fed with water purified in the purification unit 2 to be described below, and this water is led along a line 49 (outlet line) to the exhaust gas scrubber 1, resulting in internal circulation.

Downstream of the heat exchanger 11, a line 30 starts for the purification unit 2 for purifying the wash water containing impurities, i.e. the effluent. A feed pump 13 feeds effluent via a coarse filter 12 to an effluent circuit 3. The effluent feed rate is about 0.1 to 5 m³/h. The magnitude of the feed rate highly depends on the ship's engine power and the sulphur concentration of the fuel. Preferably, the feed pump 13 is a displacement type pump (positive-displacement pump), and it is arranged to produce a pressure of 0.1 to 5 bar in the line 30 downstream of the feed pump. The pressure may also be more than 5 bar, for instance 10 bar. The advantage of a displacement pump, which is e.g. of the eccentric screw pump type, is that it is highly resistant to dirt and corrosion and does not much mix the medium it is pumping. The pressure of the effluent in the line 30 upstream of the feed pump 13 is 0.1 to 10 bar, e.g. 3 to 5 bar, but may be higher than this. The pore size of the coarse filter 12 is selected such that solid impurity particles larger than 5 μm in size are filtered out; particles smaller than this pass through the filter. Typically, the pore size of the coarse filter 12 is selected such that impurity particles at least 40 μm in size, e.g. at least 50 to 100 μm, are filtered out. Such impurity particles include rust scales, large soot particles, and possible salt crystals. The coarse filter 12 is preferably a wire mesh filter. After the coarse filter 12, a second filter 12a is arranged for filtering impurity particles whose size is larger than 0.4 μm. The pore size of the filter 12a is selected such that it filters out solid impurity particles whose size is larger than e.g. 10 μm. The filter 12a may be called a micro filter. The filter 12a filters inter alia small soot particles and possible small salt crystals contained in the effluent. It is thought that the filter 12a reduces the need to clean membrane filters 4, 4a included in the purification unit 2. The filters 12, 12a may comprise cleanable or replaceable filter elements. The coarse filter 12 may alternatively be an automatic, self-cleaning filter.

The effluent that has undergone the above-described preliminary filtration is led to the effluent circuit 3. The effluent circuit 3 comprises two series-connected membrane filters 4, 4a which comprise a semipermeable membrane 7, 7a serving as a film. The membrane filters 4, 4a are capable of filtering impurities whose size is less than 0.1 μm. The membrane filters are commonly commercially available filters. They have an elongated frame structure made of a ceramic material and comprising a plurality of drillings or channels extending from an outlet end 6, 6a of the membrane filter to a discharge end 9, 9a of the membrane filter. The material of the ceramic frame is e.g. sintered alumina ($Al_2O_3$), titanium oxide ($TiO_2$), silicon oxide ($SiO_2$) or zirconium oxide ($ZrO_2$). For the sake of simplicity, only two drillings are illustrated in the figure in broken line. The diameter of the drillings is e.g. 3 to 4 mm, and the length of the membrane filter is e.g. about 1000 mm. The active layers (membranes) of the membrane filter are typically made of the same oxides as the frame structure. The active layer is thus e.g. titanium oxide ($TiO_2$) if the membrane filter is of the micro filter type, and may be e.g. zirconium oxide ($ZrO_2$) if the filter is of an ultrafilter type or a nanofilter type. The active layer may also consist of sintered alumina ($Al_2O_3$) and silicon oxide ($SiO_2$) or combinations of said oxides. Instead of an oxide layer, it is feasible that an active layer is made of an appropriate silicate or carbide. The material constituting a semipermeable membrane is porous so that it enables selective permeation of water molecules contained in the effluent on condition that the pressure is sufficiently high. The material constituting the semipermeable membrane does not, however, enable permeation of compounds dissolved in the effluent, such as dissolved carbon compounds, hydrocarbon compounds, nitrogen compounds (such as nitrates and nitrites) and sulphur compounds (such as sulphates and sulphites) and extremely small solid impurity particles, so these keep on circulating in the effluent circuit 3. Depending on the type and pore size of the membrane filter, the membrane filters 4, 4a may be used for filtering out particles whose size is as small as few nanometres only. Since the size of a water molecule is only about 0.3 nm, it penetrates the semipermeable membrane of the membrane filter.

Preferably, an ultrafilter or a nanofilter and, if permeation of very small matter is to be prevented, possibly a reverse osmosis filter, may be used as the membrane filter 4, 4a. The filtration capacity of a nanofilter is within a range of about 0.0008 to 0.008 μm (molecular weight of about 200 to 15000 being filtered out) while a reverse osmosis filter passes therethrough matter having the size of less than about 0.0011 μm (about 1 nm) whose molecular weight is within a range of 1 to 400. Metal ions can be filtered out by the reverse osmosis filter but nanofilters pass metal ions therethrough. The advantage of nanofilters is that they operate at a lower pressure than the reverse osmosis filter. The pore size of the membrane filter 4, 4a is selected such that it meets the requirements set for water purification. Those skilled in the art are capable of selecting the membrane filter on the basis of their common knowledge or by trial; the selection requires no unreasonable effort. The physical implementation of the membrane filter may vary greatly; it may be in spiral form (comprising several fibre layers), in tubular form, etc. A filter manufactured by Pall Filtersystems GmbH under the trade name SCHUMASIV (type Pall-MF 0050T6021) with a pore size of 0.05 μm may be used as the membrane filter 4, 4a, for instance.

The effluent circulates in the effluent circuit 3 by means of a circulation pump 5. The effluent circulation rate in the effluent circuit is 50 to 110 m$^3$/h, e.g. 50 to 70 m$^3$/h, depending inter alia on the number of membrane filters 4, 4a; and in order to achieve the optimal flow rate (in unit m/s), as far as the operation of the membrane filters is concerned, the pressure in the effluent circuit 3 is e.g. 2 to 7 bar, and may typically be 3 to 5 bar, but more than 7 bar, e.g. a range of 7 to 100 bar may be feasible. The optimal flow rate may be 4 to 6 m/s, for instance. From outlets 8, 8a of the membrane filters 4, 4a, through the semipermeable membrane 7, 7a, a filtrate, which is purified effluent, is discharged into a line 32. The rate of flow of purified effluent in the line 32 is 1 m$^3$/h, for instance. The rate of flow highly depends on the engine power of the ship and the efficiency of the purification unit 2, which has to be dimensioned to correspond with the purification demand. The rate of flow in the line 32 may thus vary greatly, e.g. 0.5 to 5 m$^3$/h. From the discharge end 9 of the membrane filter 4 a residue, i.e. effluent containing impurities, exits into the inlet end 6a of the membrane filter 4a, and from the discharge end 9a of the membrane filter 4a a residue, i.e. effluent containing impurities, exits into an inlet end 31 of the circulation pump 5.

It is feasible that while circulating the effluent, the membrane 7, 7a is subjected to ultrasounds at a frequency of 30 to 70 kHz, e.g. 50 kHz, and/or to vibration at a frequency of 50 to 1000 Hz in order to improve the separating power (efficiency of purification) of the membrane filter. The membrane can be made to vibrate by placing it in a vibrating fixture or housing (not shown).

Reference numbers 33 to 40 designate return valves. The return valves 33 to 40 ensure that the fluid is not allowed to circulate in a wrong direction as far as the operation of the purification apparatus is concerned.

At intervals, the effluent circuit 3 is cleaned of effluent and collected impurities since the effluent becomes concentrated with impurities as the effluent circulates in the effluent circuit 3 and purified effluent exits from the line 32. When the effluent circulates in the effluent circuit 3, solid microscopically small impurities collect in the semipermeable membranes 7, 7a of the membrane filters 4, 4a. The semipermeable membranes 7, 7a of the membrane filters 4, 4a gradually become filled with the solid, extremely small impurities, such as soot particles, after which their filtration capacity is poor and they have to be cleaned. Impurities dissolved in water do not collect in the membrane filters 4, 4a but keep on circulating in the effluent circuit 3. New effluent is fed from the line 30 to the effluent circuit 3 as purified effluent exits from the line 32 into the line 49 wherefrom the water is forwarded to the exhaust gas scrubber 1 and/or via a valve 54 into the sea. When the pressure difference becomes disadvantageously large for carrying out membrane filtration and the impurity concentration of the effluent circulating in the effluent circuit has become high, the effluent circuit 3 is cleaned by emptying it of effluent.

The cleaning of the effluent circuit 3 by emptying is carried out by leading purified water from the line 32 via a line 60 to a water tank 61 wherefrom along a line 42 water is led to the effluent circuit 3, to the "clean side" of the membrane filters 4', 4a'. Alternatively, the effluent circuit 3 may be emptied by using water to be obtained from a source other than the purified water exiting from the effluent circuit. Since water is applied to the "clean side" of the membrane filters 4, 4a, it may be said that the effluent circuit is subjected to backwashing. Reference number 62 designates a pump used for increasing the pressure in the line 42 to be higher than the pressure in the line 60. The pressure in the line 42 is preferably 6 to 12 bar, for instance 8 bar. The line 42, the pump 62, and the water tank 61 together constitute a washing device 22. Water led from the line 42 to the "clean side" of the membrane filters 4, 4a at a relatively high pressure (preferably 6 to 12 bar) removes impurities collected in the membranes 7, 7a of the membrane filters. When purified water (or another appropriate fluid) is fed by the washing device 22 via the line 42 towards the membranes 7, 7a in a direction which is opposite to the direction in which the effluent purified of impurities flows through the membranes 7, 7a, the solid impurities collected in the membranes 7, 7a can be removed and be disposed of via the line 43. Preferably, the water (or another fluid) may be supplied as pressure pulses, which enhances the removal of impurities from the membranes 7, 7a. While the washing device 22 empties the effluent circuit 3 of effluent containing a large amount of dissolved impurities, it simultaneously cleans the membranes 7, 7a of the membrane filters 4, 4a of solid impurities. In order to improve the cleaning efficiency, the water may be led to the effluent circuit heated, e.g. to a temperature of 30 to 70° C. The water tank 61 is preferably provided with a heating device 65, e.g. electric resistors, for heating the water. The volume of the water tank 61 is e.g. 50 to 150 L. Preferably, the water tank 61 is heat-insulated. A valve 63 is used for controlling the access of water into the water tank 61. A valve 64 is used for controlling the access of water into the membrane filters 4, 4a. While cleaning the effluent circuit 3, the circulation pump 5 is stopped. When the washing device 22 feeds water to the effluent circuit 3 including its membrane filters 4, 4a, the concentrated effluent in the membrane filters 4, 4a and in the lines of the effluent circuit can be led from the discharge end 9 of the membrane filter 4 along a line 56 to the line 43 and, correspondingly, led from the inlet end 6a of the membrane filter 4a along the line 41 (and possibly led from the discharge end 9a' of the membrane filter 4a' along a line 58) to the line 43, and removed from the line 43 for further treatment. Alternatively or additionally, the effluent in the membrane filter 4a may be led from the discharge end 9a along the lines 57 and 58 to the line 43, and removed from the line 43, in which case a valve 59 is open. A valve 44 of the line 43 and the valve 59 of the line 58 are normally, when effluent is circulated in the effluent circuit 3, closed but the valve 44 and, when desired, also the valve 59 is/are opened when effluent is to be removed from the line 43 or when the effluent circuit is to be cleaned (by the cleaning device 22) of effluent and solid impurities.

Instead of purified water obtained from the line 32, pressurized air or some other appropriate fluid, such as nitrogen, may be used for cleaning the effluent circuit 3. The volume of the effluent circuit 3 is e.g. 100 to 1000 L, typically 50 to 500 L. The volume depends on the engine power of the ship and the efficiency of the purification unit 2. For a heavy oil operated diesel engine of about 6000 kW power, for instance, the volume of the effluent circuit is about 60 L.

The described backwashing and the related cleaning of the membrane filters 4, 4a and emptying of the effluent circuit of effluent via the line 43 are carried out at intervals as necessary when the pressure difference so requires. Backwash procedures may be carried out e.g. four times per hour. The concentrated effluent containing impurities is emptied via the line 43 to a collection tank (not shown in FIG. 1, although a tank 68 may be called a kind of collection tank) acting as an intermediate storage whose contents may be treated ashore. The collection tank may be small since the amount of effluent exiting from the line 43 is quite small but it contains a very large amount of impurities. Among other things, the impurity concentration and feed rate (in unit m³/h) of the effluent flowing in the line 30, the volume of the effluent circuit 3, the efficiency and number of membrane filters 4, 4a, the purity requirement set for the water exiting from the line 32 have an influence on how often backwashing is to be performed. It is feasible that in association with the cleaning of the membranes 7, 7a they are subjected to ultrasounds at a frequency of 30 to 70 kHz, e.g. 50 kHz, and/or to vibration at a frequency of 50 to 1000 Hz in order to enhance the cleaning thereof.

The purification unit 2 enables the concentrated effluent to be transferred from the line 43 via a line 67 to the sludge receptacle 68 which serves as a kind of intermediate storage or buffer storage for sludge. The concentrated effluent may be fed from the sludge receptacle 68 along a line 69 back to the effluent circuit 3 wherein the effluent is again made to circulate through the membrane filters 4, 4a. In such a case, a vast majority of the concentrated effluent is purified such that purified water is led to the line 32 while water that has become even more concentrated with dirt is led to the line 43. Such additional treatment of concentrated effluent enables a very efficient purification of effluent to be achieved such that the dirt can be concentrated into a very small volume which takes very little space and which is easy to transport to final treatment. Thus, the sludge receptacle 68 may be a detachable tank to be at intervals taken ashore for hazardous waste treatment. A valve 70 is connected to the line 67 while a valve 71 is connected to the line 69.

It is feasible that the effluent circuit 3 is cleaned such that it is not emptied completely. In such a case, only smaller amounts of effluent are removed from the effluent circuit. A need to frequently remove small amounts of effluent arises if the semipermeable membranes 7, 7a of the membrane filters clog up quickly with extremely small impurities that hinder the operation of the membrane filter. If small amounts of effluent are frequently removed from the effluent circuit 3, the total amount of effluent exiting from the line 43 is larger than if substantially all effluent, highly concentrated with impurities, is removed from the effluent circuit 3 infrequently. In order to keep the total amount of effluent exiting from the line 43 small, the effluent circuit 3 and the semipermeable membranes 7, 7a are cleaned only when necessary, i.e. when they no longer operate appropriately. If the need to clean the semipermeable membranes 7, 7a is insignificant, at least a vast majority of the effluent contained in the effluent circuit 3 is removed at long intervals, rather than only in small amounts and at short intervals.

In addition to the above-described cleaning comprising backwashing, it is preferable to clean the effluent circuit 3 with a cleaning agent, which may be a basic cleaning agent. Cleaning with a cleaning agent cleans the effluent circuit more efficiently than a mere backwashing. The cleaning with a cleaning agent is performed much more seldom than the above-described backwash procedures. In FIG. 1, reference number 72 designates a cleaning agent reservoir connected to the effluent circuit. The volume of the cleaning agent reservoir 72 is e.g. 100 L. The cleaning agent reservoir is connected to the line 30, by means of which a cleaning agent is applied to a "dirty side" of the membrane filters. A need to clean the effluent circuit 3 arises when the pressure in the effluent circuit 3 rises above a certain level. Consequently, the pressure of the effluent circuit 3 is monitored by a measuring device 73. When the measuring device 73 indicates that the pressure has risen above a certain level, a cleaning agent is fed from the cleaning reservoir 72 to the effluent circuit 3. Alternatively, the effluent circuit 3 may be cleaned at certain determined intervals, in which case no measuring device 73 is necessary. Since those skilled in the art know how to design the necessary feeding arrangements, no arrangement for feeding a cleaning agent to the effluent circuit is explained in closer detail herein. Prior to feeding the cleaning agent to the effluent circuit 3, it is preferable to empty the effluent circuit of effluent.

A measuring means 19 is connected to the line 32 for measuring the pH value of the purified effluent. If the pH value is below 6.5, a feed device 20 is used for a base, e.g. lye, to the exiting water so that the pH value is at least 6.5. Temporarily, in maneuvering situations, when the load on the combustion engine varies, it may be allowable that the pH value of the purified water differs by about two pH units from the pH value of the water taken onboard the ship.

A measuring means 21 is also connected to the line 32 for determining turbidity of the purified effluent. Preferably, the turbidity must not on average (measured in a time period of more than 15 minutes) be more than 25 FNU above the value of the water taken onboard the ship, where FNU is the unit for turbidity and refers to "Formazin Nephelomeric Units". Said turbidity may also be given as a value of 25 NTU, where NTU refers to "Nephelometric Turbidity Units". The purification unit 2, the filters 12, 12a, 4, 4a included therein and the operation parameters of the purification line are adapted to fulfil a required turbidity value. The turbidity of water may be measured by a device called a nephelometer which comprises a detector for measuring how small particles contained in water scatter light. The detector is set to a side of a light beam. If the water contains a large amount of small particles, more light is reflected into the detector than if the amount of small particles is small. A calibrated nephelometer measures the turbidity of water in NTU. The ISO 7027 standard provides a test method for determining the turbidity of water.

The purified effluent is discharged into the sea and/or fed back to the exhaust gas scrubber 1 via the line 49. When necessary, a pump 50 increases the pressure of the water in the line 49 such that the pressure of the water fed to the line 15 as described above does not exceed the pressure in the line 49. If it is desired that all purified effluent is led to the exhaust gas scrubber 1, the valve 54 in the line 32 has to be closed. When necessary, the feed device 20 is used for ensuring that the pH value of the purified water is appropriate (pH about 7) to be fed to the exhaust gas scrubber 1. If it is desired that all purified effluent is discharged into the sea, a valve 53 in the line 49 has to be closed. Preferably, a junction of the lines 32 and 49 is provided with a three-way valve (not shown) for adjusting the magnitude of proportions of the purified water to be fed back to the exhaust gas scrubber 1 and to be discharged into the sea. The three-way valve is preferably automatic.

The purification unit 2 also purifies polycyclic aromatic hydrocarbons (PAH). Preferably, the operation of the purification unit 2 is designed and dimensioned such that the PAH concentration of the purified effluent is not more than 50 μg/L above the PAH concentration of the water taken in, whereby said value 50 μg/L relates to a 45 t/MWh effluent rate, where MW refers to driving a combustion engine at a power which is 80% of the maximum power of the combustion engine. Reference number 45b designates a measuring device for determining the PAH concentration in the purified effluent, i.e. in the line 32, while reference number 45a designates a measuring device for determining the PAH concentration in the line 30 prior to the purification unit 2 and the effluent circuit 3. The measuring devices 45a, 45b are measuring devices based on fluorescence when the effluent rate exceeds 2.5 t/MWh, and measuring devices based on ultraviolet light or the like when the effluent rate is below 2.5 t/MWh. Preferably, the measuring devices should be in accordance with the ISO 7027:1999 standard.

Many metals contained in the effluent, such as arsenic, cadmium, chrome, copper, lead, nickel, zinc, vanadium, molybdenum and manganese, are detrimental to the environment. The purification unit 2 enables solid compounds containing said metals, i.e. particles, to be removed from the effluent such that the filtrate exiting from the line 32 does not contain them. The metal compounds dissolved in the effluent that are not purified in the membrane filters 4, 4a may be removed from the purified effluent exiting from the membrane filters by ion exchange. The purified effluent is then led to an ion exchange apparatus, which is illustrated by reference number 66. The ion exchange apparatus comprises one or more ion exchange pastes or resins to remove dissolved metal ions. Ion exchange occurs when the water being treated passes through the ion exchange paste or resin. Ion exchange pastes or resins suitable for removal of metal cations are highly acidic cation resins and chelating cation resins, for example. The ion exchange paste or resin used may be regenerated or replaced when necessary. The ion exchange apparatus 66 enables matter that cannot be reached by a nanofilter, such as metal ions, nitrates and nitrites, to be purified.

The purification unit 2 is designed to purify nitrates ($NO_3^-$) contained in the effluent such that the amount of nitrates does not exceed an amount $NO_x$ in exhaust gases associated with a 12% reduction of the amount $NO_x$ in the exhaust gases, or does not exceed 60 mg/l when the rate of effluent removal is 45 t/MWh, where the greater one of said conditions is the determining one. Nitrites ($NO_2^-$) contained in the effluent are also purified.

Typically, the sulphur compounds contained in the effluent are in sulphate form ($SO_4^{2-}$) so, being harmless, they may be discharged into the sea water and need not be purified. Nevertheless, they are removed from the line 43 in connection with backwashing. The effluent also contains a small amount of sulphites ($SO_3^{2-}$).

It is known that the above-described arrangement enables the exhaust gases from a ship's engine to be purified so that the sulphur and nitrogen compounds remain below the given maximum values. The scrubbing of exhaust gases produces wash water whose pH, PAH and composition may be as follows:

| | |
|---|---|
| pH | 7.1 |
| PAH | 22 μg/L |
| water | <75 wt % |
| sulphates ($SO_4^{2-}$) | <25 wt % |
| nitrates ($NO_3^-$) | <0.2 wt % |
| nitrites ($NO_2^-$) | <0.2 wt % |
| metals, in total | <0.0001 wt % (e.g. 65500 μg/L V, 8000 μg/L Ni, 1100 μg/L Mo, 240 μg/L Zn, 137 μg/L Cr, 130 μg/L Cu, 95 μg/L Mg, 58 μg/L AS, 2 μg/L Pb, 1 μg/L Cd, and Hg <0.2 μg/L) |
| hydrocarbons in total | <0.0001 wt %. |

The composition depends on the engine's running conditions, the fuel used, and the running conditions of the exhaust gas scrubber (the type, amount and temperature of the water).

A person skilled in the art will appreciate that nitrates can be purified in the purification unit 2 well enough for the aforementioned requirement to be met, according to which the amount of nitrates does not exceed the amount $NO_x$ in the exhaust gases associated with a 12% reduction of the $NO_x$ amount in the exhaust gases, or does not exceed 60 mg/L when the rate of effluent removal is 45 t/MWh, where the greater one of said conditions is the determining one. Sulphates can also be purified, although they could be discharged into the sea without purification. Nitrites are also purified. The filters 12, 12a, 4, 4a included in the purifying unit 2 ensure that solid metal compounds are purified while the ion exchange apparatus 66 ensures that dissolved metal compounds are purified.

Figure 2A:
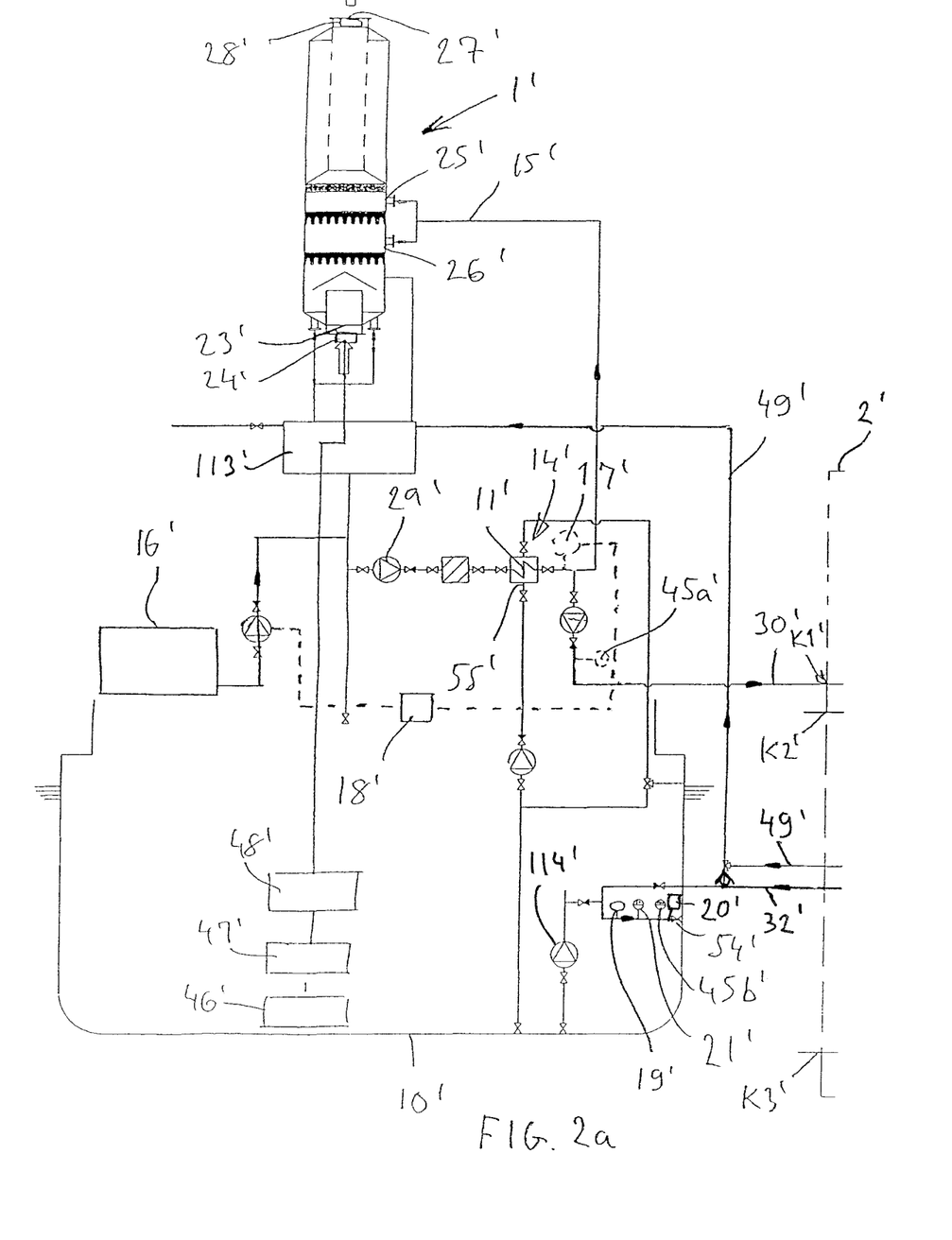
FIGS. 2a and 2b show a second embodiment of the invention for treating impurities contained in exhaust gases.
Figure 2B:
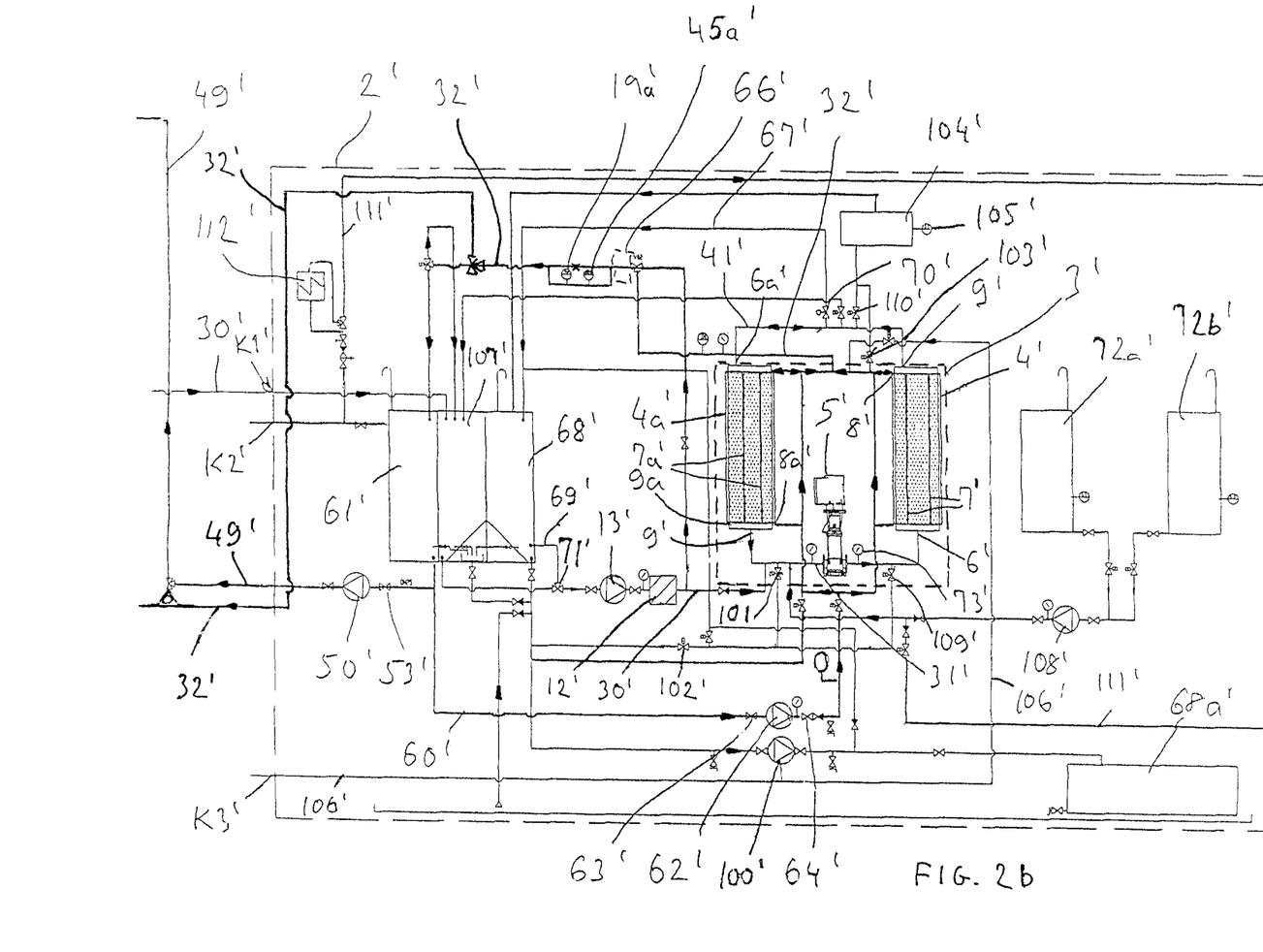

FIGS. 2a and 2b show an embodiment of the invention. FIG. 2b shows a purification unit 2' to be connected to a ship 10' shown in FIG. 2a such that when connected to the ship the purification unit is located onboard the ship. The reference numbers of the components in FIGS. 2a and 2b roughly correspond with those in FIG. 1 when the function of the components is the same or almost the same. The embodiment of FIGS. 2a and 2b differs from the embodiment of FIG. 1 inter alia such that it comprises a tank 107' arranged between an exhaust gas scrubber 1' and an effluent circuit 3' and communicating with both the exhaust gas scrubber 1' and a sludge receptacle 68'. The sludge receptacle 68' may be called a backwash tank. From the sludge receptacle 68' sludge may be led to a sludge receptacle 68a' which ashore is transferred to a waste treatment plant. The embodiment of FIGS. 2a and 2b further comprises a tank 113' arranged downstream of the exhaust gas scrubber 1' for receiving polluted wash water exiting from the exhaust gas scrubber. The tank 113' communicates with the ship's technical water, and purified water purified by the purification unit 3' may be fed thereto. A line (not shown) may be arranged for leading the purified effluent from a line 49' to a line 15' in a manner similar to that shown above in the embodiment of FIG. 1. The line 49' may be provided with a valve arrangement (not shown) to enable the feeding of purified water to be controlled alternatively to the exhaust gas scrubber 1' (via the aforementioned line not shown and the line 15') or to the tank 113', or to both the exhaust gas scrubber 1' and the tank 113' simultaneously. Reference number 114' designates a pump for feeding, when necessary, sea water to the purified water exiting from the ship 10'. When necessary, the pump 114' is used for diluting the purified effluent prior to discharging it into sea water.

In the following, it will be explained how in the embodiment of FIG. 2 the membranes 7', 7a' of the membrane filters 4', 4a' are cleaned with a chemical cleaning agent in order to clean them of impurities and how the membrane filters are subjected to intermediate washing. The pump 13' is stopped while the membranes 7', 7a' are being cleaned. Prior to cleaning the membranes 7', 7a', the dirty side of the membrane filters 4', 4a' is emptied of effluent. The emptying may be carried out with pressurized air or by a drainage pump 100' or by both the pressurized air and the drainage pump 100'.

Emptying the Dirty Side of the Membrane Filters by Means of Pressurized Air

Pressurized air is applied from a pressurized air line 106' to the clean side of the membrane filters 4', 4a', whereby the air passes from the clean side of the membrane filters to their dirty side and the effluent is led to the sludge receptacle 68' by opening valves 101', 102', 109'.

Emptying the Dirty Side of the Membrane Filters by Means of a Drainage Pump

The drainage pump 100' is used for sucking at the lowest point of the circulation, and the effluent is led to the sludge receptacle 68'. For the emptying, a ventilation valve 103' provided at an upper part of the circulation must be opened.

Emptying the Dirty Side of the Membrane Filters by Means of Pressurized Air and a Drainage Pump The drainage pump 100' is used for sucking at the lowest point of the circulation, and the effluent is led to the sludge receptacle 68'. For the emptying, the ventilation valve 103' provided at the upper part of the circulation must be opened.

Filling the Membrane Filters for Cleaning, and Cleaning with a Basic Cleaning Agent After the membrane filters 4', 4a' have been emptied, the filling of the membrane filter for cleaning is started. The ventilation valves 103', 110' of air venting lines to an expansion tank 104' are opened. The membrane filters 4', 4a' are filled with heated technical water supplied from a line 111', and simultaneously a basic cleaning agent is dispensed from a basic cleaning agent reservoir 72a' by means of a cleaning agent feed pump 108'. Reference number 112' designates a heater. The membrane filters 4', 4a' are filled up when a level switch 105' connected with the expansion tank 104' indicates this. The cleaning is started by starting a circulation pump 5'.

Emptying and Intermediate Washing of the Membrane Filters

After cleaning, the membrane filters 4', 4a' are emptied as explained above, after which the membrane filters are filled and washed as explained above with the exception that no cleaning agent is used.

After the aforementioned treatment the membrane filters 4', 4a' have been cleaned, and the purification process of effluent from the exhaust gas scrubber may continue by starting the feed pump 13' and the circulation pump 5'.

When necessary, the membrane filters 4', 4a' may also be cleaned with an acidic cleaning agent. The cleaning with an acidic cleaning agent is carried out as explained above, but instead of a basic cleaning agent an acidic cleaning agent obtained from an acidic cleaning agent reservoir 72b' is used. After the membrane filters 4', 4a' have been cleaned with the acidic cleaning agent, the membrane filters are emptied and subjected to intermediate washing as described above.

Preferably, the purification unit 2' according to the invention may be a transportable container-like unit since such a structure is quite easy to connect to old, already existing ships as retrofitting. In FIG. 2, reference identification K1 designates a connecting means K1' for connecting the purification unit 2' to an effluent pipe 30' coming from the ship's exhaust gas scrubber 1', reference identification K2' designates a connecting means for connecting the purification unit to the ship's water distribution circuit, and reference identification K3' designates a connecting means for connecting the purification unit to the ship's pressurized air circuit so as to enable pressurized air to be applied to the clean side of a membrane filter. It is feasible that components designated by reference numbers 19', 21', 45' and 20' are located inside the container-like unit.

EXAMPLE. The method and purification unit according to the invention were used for treating effluent from an exhaust gas scrubber of a heavy oil operated diesel engine of about 6000 kW power. The turbidity, pH and composition of the effluent prior to purification were: Turbidity 87 FNU, pH 12, nitrates ($NO_3^-$) 5.0 mg/L, nitrites ($NO_2^-$) 5.3 mg/L, sulphates ($SO_4^{2-}$) 940 mg/L, sulphites ($SO_3^{2-}$)<20 mg/L, and PAH compounds 84 µg/L in total. The effluent was fed to the purification unit at about 1.5 m$^3$/h through a coarse filter with a pore size of 35 µm. The effluent circulated in the effluent circuit provided with two series-connected membrane filters with a pore size of 50 nm. The flow rate in the effluent circuit was about 6 m/s and the pressure was 3 bar. The turbidity, pH and composition of the effluent after purification were: Turbidity 1.6 FNU, pH 12, nitrates ($NO_3^-$) 4.8 mg/L, nitrites ($NO_2^-$) 5.1 mg/L, sulphates ($SO_4^{2-}$) 380 mg/L, sulphites ($SO_3^{2-}$)<10 mg/L, and PAH compounds 6.9 µg/L in total.

In summary, it can be stated that the above-described arrangement enables exhaust gases to be purified and wash water to be treated such that even strict requirements and recommendations are met, e.g. those set forth in the IMO resolution MEPC.184 (59) ("GUIDELINES FOR EXHAUST GAS CLEANING SYSTEMS") issued in 2009.

It is clear that the arrangement requires some experimenting and adjusting so as to make the operation of the purification device as desired and meet the requirements set.

In the following, a list is presented to explain the meaning of the reference numbers used in FIGS. 1 and 2:
 1, 1' exhaust gas scrubber
 2, 2' purification unit
 3, 3' effluent circuit
 4, 4a, 4', 4a' membrane filter (a filter containing a semipermeable membrane)
 5, 5' circulation pump
 6, 6' inlet end of the membrane filter 4, 4'
 6a, 6a' inlet end of the membrane filter 4a, 4a'
 7, 7' semipermeable membrane
 7a, 7a' semipermeable membrane 8, 8' outlet of the membrane filter 4, 4'
8a, 8a' outlet of the membrane filter 4a, 4a'
9, 9' discharge end of membrane filter 4, 4'
9a, 9a' discharge end of the membrane filter 4a, 4a'
10, 10' ship
11, 11' heat exchanger
12, 12' coarse filter
12a micro filter
13, 13' feed pump
14, 14' cooling apparatus
15, 15' line
16, 16' base feeding means
17, 17' measuring means for determining pH value of effluent exiting from the exhaust gas scrubber 1
18, 18' control means for controlling the base feeding means 16
19, 19', 19a' measuring means for determining pH value of purified effluent
20, 20' feed device for feeding a base to purified effluent
21, 21' measuring means for determining turbidity of purified water
22 backwash system
23, 23' exhaust gas entrance point
24, 24' measurement device for measuring $CO_2$ value of exhaust gases
25, 26, 25', 26' water feeding point
27, 27' discharge point of purified exhaust gases
28, 28' measurement device for determining $SO_2$ value of exhaust gases
29, 29' pump
30, 30' line (effluent line)
31, 31 inlet end of the circulation pump 5, 5'
32, 32' line
33 to 40 return valves
41, 42, 43 line
44 valve
45a, 45b, 45a', 45b' measurement device for determining PAH concentration
46, 46' diesel engine
47, 47' catalyser
48, 48' exhaust gas boiler
49, 49' line (outlet line)
50, 50' pump
51, 52 return valve
53, 54, 53', 54' valve
55 water feeding point
56, 57, 58 line
59 valve
60, 60' line
61, 61' water tank
62, 62' pump
63, 64, 63', 64' valve
65 heating device
66, 66' ion exchange apparatus
67, 67' line
68, 68', 68a' sludge receptacle
69, 69 line
70, 70' valve
71, 71' valve
72, 72a', 72b' cleaning agent reservoir
73, 73' measurement device
100' drainage pump
101', 102' valve
103' ventilation valve
104' expansion tank
105' level switch
106' pressurized air line
107' water line
108' feed pump
109' valve
110' ventilation valve
111' line
112' heater
113' tank
114' pump
K1', K2', K3' connecting means.

The invention has been disclosed above by means of a preferred embodiment only, and therefore it is to be noted that the details of the invention may be implemented in many different ways within the scope of the accompanying independent claims. Thus, for instance, the number of membrane filters (4, 4a) containing a semipermeable membrane may vary. It is feasible that the membrane filters are connected in parallel, as distinct from being connected in series as shown in the figure. Preferably, the purification unit (2) comprises a plurality of effluent circuits (3) and membrane filters (4, 4a), the effluent circuits being grouped such that at least one effluent circuit and/or at least one membrane filter therein is in use when at least one other effluent circuit and/or at least one membrane filter therein is being cleaned of effluent and/or impurities. This enables the purification unit to operate uninterruptedly while being cleaned. Instead of a feed pump 13, it is at least in principle feasible that the wash water to be purified is fed to the effluent circuit 3 by means of gravity. Prior to being led to the effluent circuit 3, the effluent may be filtered by means of one or more filters (cf. filters 12 and 12a).

The invention claimed is:
1. A ship comprising:
an exhaust gas scrubber configured to scrub exhaust gases from a combustion engine of the ship and reduce sulphur dioxide emissions;
a purification unit configured to wash water to be purified and that exits from the exhaust gas scrubber, the purification unit comprising an effluent circuit comprising a circulation pump and at least one membrane filter, said at least one membrane filter being a micro filter or an ultrafilter, and said at least one membrane filter not being a reverse osmosis filter, said at least one membrane filter comprising a semipermeable membrane;
a heat exchanger located upstream of the purification unit, the heat exchanger being configured to cool down wash water coming from the exhaust gas scrubber; and
a feeder line configured to feed the cooled wash water back to the exhaust gas scrubber,
wherein the exhaust gas scrubber, the purification unit, the heat exchanger, and the feeder line create a closed loop system, and
wherein the circulation pump circulates effluent to be purified in the effluent circuit by feeding effluent to an inlet end of said at least one membrane filter such that the effluent flowing through the at least one membrane filter filters through the semipermeable membrane and exits, purified, from an outlet of said at least one membrane filter and from the effluent circuit to a pH monitoring meter configured to determine a pH value of the purified effluent while a controller controls a base feeder configured to feed a base configured to adjust the pH value, while a residue containing impurities is led from a discharge end of said at least one membrane filter back to the circulation pump and from the circulation pump again to the inlet end of said at least one membrane filter.

2. The ship as claimed in claim 1, wherein the purification unit comprises a feed pump configured to pump effluent to be purified to the effluent circuit.

3. The ship as claimed in claim 1, wherein the heat exchanger comprises an inlet that receives raw water, and wherein the heat exchanger is configured to cool cools down the wash water with raw water prior to leading the wash water back to the exhaust gas scrubber.

4. The ship as claimed in claim 1, further comprising a feeder configured to feed a base to the wash water prior to feeding the wash water back to the exhaust gas scrubber.

5. The ship as claimed in claim 1, wherein the purification unit comprises a coarse filter arranged upstream of the effluent circuit.

6. The ship as claimed in claim 1, wherein the pH monitoring meter is coupled to the outlet of the at least one membrane filter and configured to determine the pH value of the purified effluent exiting from the outlet of the at least one membrane filter, and the base feeder is coupled to the outlet of the at least one membrane filter and is configured to feed the base to the purified effluent.

7. The ship as claimed in claim 1, further comprising a membrane filter line connecting the outlet of the at least one membrane filter to a water feeding point of the exhaust gas scrubber that feeds the purified effluent back to the exhaust gas scrubber.

8. The ship as claimed in claim 1, further comprising a turbidity meter configured to measure turbidity of the purified effluent exiting from the membrane filter.

9. The ship as claimed in claim 1, wherein the effluent circuit comprises at least two membrane filters.

10. The ship as claimed in claim 1, further comprising a backwash system configured to clean the semipermeable membrane of the at least one membrane filter of impurity particles,
    wherein the backwash system feeds a fluid free of impurities in a flow direction of the semipermeable membrane of the at least one membrane filter, which is opposite to the flow direction of the purified effluent.

11. The ship as claimed in claim 1, wherein the at least one membrane filter is a ceramic membrane filter.

12. A purification unit for purifying polluted wash water, or effluent, exiting from an exhaust gas scrubber of a ship, the purification unit being a container unit comprising:

- a first connector configured to connect the purification unit to an effluent line coming from the exhaust gas scrubber of the ship and connected to a heat exchanger located upstream of the purification unit, the heat exchanger being configured to cool down wash water coming from the exhaust gas scrubber;
- a second connector configured to connect the purification unit to a water distribution circuit of the ship;
- an outlet line configured to discharge from the purification unit the effluent purified therein;
- a feeder line configured to feed the cooled wash water back to the exhaust gas scrubber,
- the purification unit creating a closed loop system in conjunction with the exhaust gas scrubber, the heat exchanger, and the feeder line; and
- an effluent circuit comprising a circulation pump and at least one membrane filter, said at least one membrane filter being one of a micro filter and an ultrafilter, and said membrane filter is not a reverse osmosis filter, said membrane filter comprising a semipermeable membrane,
- wherein the circulation pump circulates the effluent to be purified in the effluent circuit by feeding the effluent to an inlet end of said at least one membrane filter such that the effluent flowing through said at least one membrane filter filters through the semipermeable membrane and exits, purified, from an outlet of said at least one membrane filter and from the effluent circuit to a pH monitoring meter configured to determine a pH value of the purified effluent while a controller controls a base feeder configured to feed a base to adjust the pH value, while a residue containing impurities is led from a discharge end of said membrane filter back to the circulation pump and from the circulation pump again to the inlet end of said membrane filter.

13. The purification unit as claimed in claim 12, further comprising a third connector configured to connect the purification unit to a pressurized air circuit of the ship to enable pressurized air to be applied to a clean side of said membrane filter.

* * * * *